United States Patent [19]

Futamura et al.

[11] Patent Number: 4,835,199
[45] Date of Patent: May 30, 1989

[54] BITUMINOUS COMPOSITION COMPRISING A BLEND OF BITUMEN AND A THERMOPLASTIC ELASTOMER

[75] Inventors: Shingo Futamura, Wadsworth; Georg G. A. Bohm, Akron, both of Ohio

[73] Assignee: The Firestone Tire & Rubber Company, Akron, Ohio

[21] Appl. No.: 37,287

[22] Filed: Apr. 10, 1987

[51] Int. Cl.⁴ .................... C08L 53/02; C08L 95/00
[52] U.S. Cl. ........................... 524/66; 524/68; 525/54.5
[58] Field of Search ............... 524/68, 66; 525/54.5, 525/313, 314, 315, 316, 332.9

[56] References Cited

U.S. PATENT DOCUMENTS

| | | | |
|---|---|---|---|
| 3,265,765 | 8/1966 | Holden et al. | 260/876 |
| 3,856,732 | 12/1974 | Bresson et al. | 260/28.5 |
| 3,978,014 | 8/1976 | van Beem et al. | 260/28.5 |
| 4,032,491 | 6/1977 | Schoenke | 260/28.5 |
| 4,102,849 | 7/1978 | Bouton et al. | 260/33.6 |
| 4,172,061 | 10/1979 | Bresson | 524/68 |
| 4,196,115 | 4/1980 | Bresson | 260/28.5 |
| 4,217,259 | 8/1980 | Bresson | 524/68 |
| 4,282,127 | 8/1981 | Desagouilles | 260/28.5 |
| 4,490,493 | 12/1984 | Mikols | 524/68 |
| 4,530,652 | 7/1985 | Buck et al. | 524/68 |
| 4,610,902 | 9/1986 | Eastman et al. | 428/57 |

FOREIGN PATENT DOCUMENTS

| | | | |
|---|---|---|---|
| 740027 | 8/1966 | Canada | 524/68 |
| 0072042 | 2/1983 | European Pat. Off. | 524/68 |
| 2709289 | 9/1977 | Fed. Rep. of Germany | 524/68 |
| 51-20219 | 2/1976 | Japan | 524/68 |
| 2010289 | 6/1979 | United Kingdom | 524/68 |

*Primary Examiner*—Allan M. Lieberman
*Attorney, Agent, or Firm*—Frank J. Troy, Sr.

[57] ABSTRACT

A bituminous composition comprising a blend of bitumen and a thermoplastic elastomer containing at least two polymer blocks wherein one of said polymer blocks is a crystalline polymer block and one of said polymer blocks is an amorphous polymer block, is provided.

The bituminous composition has particular application as a roof coating or waterproofing material or road paving material.

14 Claims, No Drawings

BITUMINOUS COMPOSITION COMPRISING A BLEND OF BITUMEN AND A THERMOPLASTIC ELASTOMER

BACKGROUND OF THE INVENTION

The invention relates to a bituminous composition comprising a blend of bitumen and a thermoplastic elastomer. More particularly, the invention relates to a bituminous composition comprising a blend of a bitumen such as asphalt and a thermoplastic elastomer containing at least two polymer blocks wherein one of said polymer blocks is a crystalline polymer block having a Tm above 40° C. and one of said polymer blocks is an amorphous polymer block having a Tg of 0° C. or lower.

Bituminous materials especially asphalt have long been utilized in roofing materials particularly in built up roofing (i.e. BUR) application, as road paving materials and as adhesive materials. Unfortunately, however, such materials tend to deteriorate under conditions of extreme temperature variations, constant exposure to physical stress and environmental weathering.

In order to overcome the deficiencies of these bituminous materials particularly asphalt, those active in this field have proposed blending various polymers particularly polyolefins and elastomeric polymers with the asphalt. Thus, polyolefins suchs as polyethylene and polypropylene have been blended with asphalt. However, the polyolefins tend to stiffen the resulting compositions which often results in poor low temperature flexibility. The polyolefin modified asphalts tend to become brittle when exposed to low temperatures and are consequently subject to cracking. Unsaturated elastomers or elastomeric polymers such as polybutadiene and random butadiene-styrene copolymers have been blended with asphalt. However, it has been found that in addition to difficiencies in dimensional stability such unsaturated polymers are susceptible to oxidation particularly when exposed to high temperatures and as a result lose many of their desirable properties such as flexibility and strength.

More recently, those active in the bituminous material field have proposed blending hydrogenated butadiene-styrene random copolymers, butadiene-styrene block copolymers and hydrogenated butadiene-styrene block copolymers with asphalt as shown by the following patents:

U.S. Pat. No. 3,856,732 to Bresson et al., relates to a modified asphalt hydraulic sealer which comprises a cut back asphalt and a small amount (e.g. 1 to 10%) of a butadiene-styrene block copolymer of the SBS type, a hydrogenated random butadiene-styrene copolymer or mixtures thereof or an ethylene-vinyl acetate copolymer.

U.S. Pat. No. 3,978,014 to Van Beem et al., relates to bituminous compositions comprising: (a) 95%-75% by weight of a bituminous component Q having an aromaticity exceeding $0.004+P+0.280$ in which P is the N-heptane asphaltene content, (b) 4%-15% by weight of a block copolymer, $M_1$, preferably a polystyrene-polyalkadiene-polystyrene; and (c) 4%-15% by weight of a thermoplastic polymer, $M_2$, different from $M_1$ and which has a molecular weight above 10,000, a solubility parameter 7.8-8.8 and a crystallinity below 60% at 25° C. The patent discloses at column 1, lines 46-55 and column 2, lines 48-57 that the block copolymer, $M_1$ is of the general formula A-B-A in which the A's represent the same or different thermoplastic non-elastomeric polymer blocks prepared by polymerization of one or more monoalkenyl aromatics and in which B represents an elastomeric polymer block prepared either by polymerization of one or more conjugated alkadienes or by copolymerization of one or more conjugated alkadienes with one or more monovinyl aromatics. At column 1, lines 53-55, the patent further discloses that polymer block B may be completely or partly hydrogenated, if desired.

U.S. Pat. No. 4,032,491 to Schoenke relates to a roofing composition for producing a roofing membrane having good bond strength, resistance to cracking, tensile strength and hardness, comprising 5%-40% of asphalt and 60%-95% of a block copolymer of the A-B-A type in which each end block A is formed from a vinyl aromatic monomer and midblock B is a hydrogenated polydiene or a polymer of the ethylene/propylene or ethylene/butylene type. As will be evident, the roofing composition of this patent is basically a block copolymer based composition rather than an asphalt based composition.

U.S. Pat. No. 4,102,849 to Bouton et al., relates to oil-extended hydrogenated diblock copolymers comprising 10-200 parts of oil per 100 parts of a hydrogenated diblock compolymer comprising one block of polybutadiene and one block of a random copolymer of a vinyl arene, such as styrene, and butadiene. The patent, at column 6 lines 53-58, states that the oil-extended hydrogenated diblock copolymers may be utilized for a wide variety of molding operations particularly for rubber hose, shoe soles, tires, industrial and automotive goods, etc. The patent, at column 6 lines 63-68; further discloses that the oil-extended hydrogenated diblock copolymers may be modified by the presence of asphalt, wax, polyvinyl compounds such as polystyrene, ordinary polymers of alpha-olefins such as polypropylene or polyethylene or may be mixed with either natural or synthetic rubbers such as polyisoprene and polybutadiene.

U.S. Pat. No. 4,196,115 to Bresson relates to bituminous or asphalt-based roofing or waterproofing compositions having desirable high and low temperature properties which comprise bitumen or asphalt, at least one radial conjugated diene/monovinyl aromatic copolymer having a weight average molecular weight (Mw) of above 200,000 and a conjugated diene/monovinyl aromatic ratio of 50/50 to 85/15 and at least another or second type radial or linear conjugated diene/monovinyl aromatic copolymer having an Mw of below 200,000 and having the same ratios of conjugated diene/vinyl aromatic. As disclosed in the patent, the conjugated diene/vinyl aromatic copolymers are block copolymers represented by the formula $(A-B-A)_xY$ or $(A-B)_xY$ wherein A represents a non-elastomeric poly(monovinyl aromatic) block containing 8-18 carbon atoms per molecule, and B represents an elastomeric poly (conjugated diene) block containing 4-12 carbon atoms per molecule, Y is at least one atom derived from a polyfunctional treating agent and x represents the number of functional groups of said polyfunctional treating agent and is an integer equal to at least 3.

U.S. Pat. No. 4,282,127, to Desgouilles, relates to a bitumen—based composition comprising a ternary mixture of (a) 52-78 weight % of bitumen, (b) 20-40 weight % polyolefin and (c) 2-8 weight % of a butadiene-styrene copolymer. As set forth in the patent, the butadiene-styrene copolymer may be a random copolymer or a block copolymer with triblock styrene-butadiene-styrene copolymers being particularly suitable.

U.S. Pat. No. 4,610,902 to Eastman et al., relates to a laminate composition useful as a roofing membrane comprising a top and a bottom layer of plastic film bonded together by a modified bitumen material, the top layer of said laminate either containing or being surface coated with an ultraviolet light resistant and absorbing agent. As set forth in the patent, the modified bitumen material is formed by blending a thermoplastic elastomer or thermoplastic rubber or a polyurethane into the bitumen. Thermoplastic elastomers or thermoplastic rubbers disclosed in the patent are styrene-butadiene-styrene (SBS), styrene-isoprene-styrene (SIS) and styrene-ethylene-butylene-styrene (SEBS) block copolymers.

It should be noted that U.S. Pat. No. 4,032,491 and 4,102,849 above appear to be block copolymer based compositions rather than bitumen—or asphalt—based compositions.

Bituminous compositions which have been modified with block copolymers of the SBS type as described in several of the aforementioned patents exhibit a number of advantageous properties particularly good low temperature properties and good dimensional stability. However, such compositions exhibit the significant disadvantage that the unsaturated block copolymers are also susceptible to oxidation when exposed to high temperatures.

Bituminous compositions which have been modified with hydrogenated random copolymers of butadiene-styrene and hydrogenated SBS block copolymers as described in several of the above patents, exhibit a number of advantageous properties including good low temperature and high temperature properties as well as good dimensional stability. However, such compositions also have certain disadvantages. Thus, such compositions are generally difficient in solvent resistance. Moreover, bituminous compositions modified with hydrogenated SBS block copolymers often vary in properties depending upon the nature and type of bitumen which is blended with the hydrogenated SBS block copolymer.

Accordingly, there remains a need for bituminous compositions for roofing application which provide a combination of desirable properties including good low temperature and high temperature properties, weathering resistance, dimensional stability, solvent resistance and uniformity of properties.

SUMMARY OF THE INVENTION

In accordance with the present invention, a bituminous composition having such a desirable combination of properties is provided. The composition comprises a blend of: (a) from about 65% to about 99% by weight of bitumen and (b) from about 1% to about 35% by weight of a thermoplastic elastomer containing at least two polymer blocks, wherein one of said polymer blocks is a crystalline polymer block having a Tm above 40° C. and one of said polymer blocks is an amorphous polymer block having a Tg of 0° C. or lower, and wherein the weight ratio of crystalline polymer block to amorphous polymer block is within the range of from 10:90 to 80:20.

DETAILED DESCRIPTION OF THE INVENTION

The term "bitumen" can generally be defined as mixtures of hydrocarbons of natural or pyrogenous origin or combinations of both, frequently accompanied by their non-metallic derivatives, which may be gaseous, liquid, semi-solid or solid, and which are usually soluble in carbon disulfide. For the purposes of the present invention, bitumen of a liquid, semi-solid or solid nature may be utilized. From a commercial standpoint, bitumen is generally restricted to asphalts and tars and pitches. A listing of various bituminous materials which can be utilized in the present invention include the following:

I. Asphalts
 1. Petroleum Asphalts
  A. Straight-reduced asphalts
   1. Atmospheric or reduced-pressure reduction
   2. Solvent precipitated, as with propane
  B. Thermal asphalts, as residues from cracking operations on petroleum stocks
  C. Air-blown asphalts 1. Straight-blown 2. "Catalytic"-blown
 2. Native Asphalts
  A. With mineral content below 5%
   1. Asphaltites such as gilsonite, graphamite, and glance pitch
   2. Bermudez and other natural deposits
  B. With mineral content over 5%
   1. Rock asphalts
   2. Trinidad and other natural deposits
II. Tars and Derivatives
 1. Residua from coke-oven-derived coal tars
  A. Coal tars reduced to float grades, as RT (road tar) grades for paving purposes
  B. Coal-tar pitches, with reduction carried out to softening-point grades
 2. Residua from other pyrogenous distillates as from water-gas, wood, peat, bone, shale, rosin, and fatty acid tars.

As can be readily appreciated by those skilled in the art, the weight average molecular weight of the various bitumens can vary over a very wide range, for example such as from about 500 to about 10,000. Additionally, the softening point of the various types of asphalt will also vary such as from about 50° F. to about 400° F.

Of the many types of asphalts which may be utilized, petroleum, and native are desired, with petroleum being preferred. Of the petroleum asphalts, the thermal asphalts are preferred.

The amount of bitumen utilized in the compositions of the invention may range from about 65 to about 99 parts by weight with preferred amounts ranging from about 80 to about 98 parts by weight.

As indicated above, the thermoplastic elastomer component of the compositions of the invention is a thermoplastic elastomer containing at least two polymer blocks, wherein one of said polymer blocks is a crystalline polymer block having a Tm (i.e. melting point) above 40° C. and one of said polymer blocks is an amorphous polymer block having a Tg of 0° C. or lower and wherein the weight ratio of crystalline polymer block to amorphous polymer block is within the range of from 10:90 to 80:20. A preferred thermoplastic elastomer of this type is one in which the crystalline polymer block has a Tm of from 60° to 165° C., the amorphous polymer block has a Tg of from −15 to −100° C. and the weight ratio of crystalline polymer block to amorphous polymer block is within the range of from 15:85 to 60:40. A particularly preferred thermoplastic elastomer is one in which the crystalline polymer block has a Tm of 70° to 140° C., the amorphous polymer block has a Tg of below −20° C. and the weight ratio of crystalline polymer block to amorphous polymer block is within the range of from 25:75 to 50:50.

In general, any thermoplastic elastomer having the above characteristics may be utilized in the compositions of the invention. However, the preferred thermoplastic elastomers are block copolymers in which the crystalline polymer block is a hydrogenated block of polybutadiene and the amorphous polymer block is a hydrogenated block of a random copolymer of a vinyl arene (e.g. styrene) and 1,3-butadiene. It should be noted that while the preferred crystalline polymer block is a hydrogenated block of polybutadiene, this polymer block may also include small amounts (up to 20%) of a vinyl arene monomer or other monomers which are copolymerizable with 1,3-butadiene so long as this polymer block meets the above limitations. Moreover, other amorphous polymer blocks may be utilized instead of the preferred hydrogenated block of random copolymer. Thus, other amorphous polymer blocks may be employed including a hydrogenated block of a polybutadiene having a 1,2-microstructure content of from 35-90% prior to hydrogenation, a hydrogenated block of polyisoprene, a hydrogenated block of an isoprene/butadiene copolymer and the like. It should further be understood that these block copolymers may contain other polymer blocks in addition to the above hydrogenated blocks provided that they do not adversely affect the desired properties of the block copolymer.

The particularly preferred thermoplastic elastomers for use in the compositions herein are hydrogenated diblock copolymers of the type described in U.S. Pat. No. 4,102,489, the disclosure of which is incorporated herein by reference. Especially preferred hydrogenated diblock copolymers of that type are those containing from 20%-70% by weight of a hydrogenated block of a polybutadiene having a 1,2-microstructure content of less than 30% prior to hydrogenation and from 30%-80% by weight of a hydrogenated block of a random copolymer of a vinyl arene (e.g. styrene) and 1,3-butadiene containing from 5%-50% by weight of vinyl arene and 50% -95% by weight of butadiene with the butadiene portion of the random copolymer having a 1,2-microstructure content of 5%-80% prior to hydrogenation. These hydrogenated diblock copolymers have an average molecular weight of 15,000-1,000,000, preferably 20,000-500,000, as determined by viscosity measurement and a residual aliphatic unsaturation content of less than 20%, preferably less than 10%, of the original aliphatic unsaturation content prior to hydrogenation.

The hydrogenated diblock copolymers may be prepared in known manner by first preparing the non-hydrogenated diblock copolymer using known block copolymer polymerization processes and then hydrogenating the resultant diblock copolymer using known hydrogenation processes and hydrogenation catalysts. Thus, in preparing the non-hydrogenated diblock copolymer, various polymerization methods known in the art may be utilized. Preferably, the polybutadiene block is formed first and then, without deactivating the polymerization initiator, the random copolymer block is formed directly thereon. Alternatively, however, the random copolymer block may be formed first and then, without deactivating the polymerization initiator, the polybutadiene block may be formed directly thereon.

Vinyl arenes which may be employed in preparing the random copolymer block of the diblock copolymer include any vinyl or alpha-methyl vinyl arene compounds which are capable of being polymerized by an anionic initiator. Suitable vinyl arenes of that type include styrene, alphamethyl styrene, vinyl toluene, vinyl naphthalene and the like. The preferred vinyl arene is styrene.

The polybutadiene block of the diblock copolymer is generally prepared by polymerizing 1,3-butadiene in the presence of an organolithium initiator in an inert liquid hydrocarbon medium.

Organolithium initiators which may be employed are compounds having the formula R Li, wherein R is an aliphatic, cycloaliphatic or aromatic hydrocarbon radical containing from 1 to 20 carbon atoms. Suitable organolithium compounds include among others methyllithium, ethyllithium, isopropyllithium, n-butyllithium, sec-butyllithium, t-butyllithium, hexyllithium, n-decyllithium, cyclohexyllithium, phenyllithium, p-tolyllithium and the like. The preferred organolithium compounds are alkyllithium compounds containing from 1 to 8 carbon atoms in the alkyl radical and of these n-butyllithium is particularly preferred.

The inert liquid hydrocarbon employed as the polymerization medium is advantageously an alphatic hydrocarbon having 4-10 carbon atoms or an aromatic hydrocarbon having 6-10 carbon atoms which is inert to the polymerization initiator employed. The liquid hydrocarbon may be one in which the polymer is soluble or partly soluble or in which the polymer is suspended. Suitable liquid hydrocarbons include pentanes, hexanes, heptanes, cyclohexane, benzene and toluene with hexanes and cyclohexanes being preferred. Mixtures of these liquid hydrocarbons may also be utilized.

From 200 to 900 parts by weight of liquid hydrocarbon per 100 parts of monomer is generally sufficient to yield a fluid polymer solution or suspension which can be easily handled.

The temperature of the polymerization mass should be maintained between 0° and 175° C., preferably 50°-150° C.

Polymerization is advantageously performed in an agitated, pressurized reactor which may be jacketed to allow for temperature control. Pressures are generally autogenous, although inert gases can be charged to the reactor to increase the pressure, if desired. Dry nitrogen, argon, helium or other inert gas can be used for this purpose. Normally pressures will be atmospheric or above, and can be as high as 10 atmospheres or more.

In one method of forming the random copolymer block, a styrene-butadiene monomer mixture in the desired ratio is fed into the reactor at such a rate that as the butadiene is continuously consumed the styrene is also copolymerized in a random repeating unit arrangement. This polymerization rate is affected by a number of factors, including the temperature, the solvent or diluent, the ratio of styrene to butadiene, the specific type of catalyst used, and the concentration of catalyst. It is also very important to have very efficient agitation to provide homogeneity and intimate contact of the various components.

When the monomer mixture feed rate is maintained slow enough to maintain a low instantaneous monomer concentration (starved condition), random copolymerization is effected. Random copolymerization may also be assured by adding all of the styrene initially to the polymerization system containing the polybutadiene block in the form of polybutadiene-Li and then adding the butadiene gradually at about or less than the rate at which it is being polymerized. Then with the system being maintained deficient in butadiene because it is being polymerized as fast as it is being fed into the system, the styrene is copolymerized to form the random copolymer block. After the butadiene is all added and polymerized, the remaining styrene monomer is swept from or otherwise removed from the system to avoid the formation of a terminal block of polystyrene. If the amount of styrene remaining is small, it may be polymerized since a very small terminal block of polystyrene will not be harmful. Up to 10% block polystyrene may be tolerated in the copolymer without harmful effects on the properties, and preferably there is no more than 5%. In another method of forming a random copolymer, a randomizer such as ether or an amine can be added to the polymerization system to promote random polymerization of butadiene and styrene.

The microstructure of the butadiene block in the basic non-hydrogenated polymer is important because it influences the properties of the resulting fully hydrogenated block copolymers. For example, block sequences derived from butadiene polymerized by 1,4 addition yield, upon hydrogenation, unsubstituted polyethylene sequences. Those units which enter the polymeric block via 1,2 addition polymerization yield ethyl-substituted ethylene units upon hydrogenation. The 1,2 content is advantageously below 30%, preferably below 20%.

The hydrogenation of the diene-vinyl arene diblock copolymer may be carried out by a variety of methods. The hydrogenation may be effected by placing the diblock copolymer in a hydrocarbon solution in the presence of a suitable catalyst and applying hydrogen gas under pressure to this solution. The method may be either continuous or a batch process.

The diblock polymer concentration may vary between about 0.5% to about 50% by weight of the hydrocarbon solution and preferably within a range of about 2% to about 35%.

Suitable solvents include saturated cyclic hydrocarbons, such as cyclohexane, methylcyclohexane, decalin, and the like, preferably boiling above atmospheric temperature. Aromatic hydrocarbons, such as benzene and toluene; and paraffinic hydrocarbons such as isooctanes, isoheptanes, and normal heptane, hexane, pentane and the like; hydroaromatic hydrocarbons such as tetralin and the like, can also be used. Mixtures of solvents and/or dispersants can be used if desired.

In one embodiment, after the polymer has been dissolved in the solvent, the hydrogenation catalyst is added, hydrogen is added, and the temperature raised to a suitable level to initiate the reaction. Either the catalyst or the solution of polymer can be added in increments after the reaction temperature has been reached. This operation can be carried out in a batch-wise or a continuous process. When sufficient hydrogenation has been effected, usually indicated by a decrease in unsaturation or a drop in hydrogen pressure, the reaction is stopped and the dispersion or solution treated by suitable means, to deactivate or to remove the catalyst.

In the hydrogenation step, any catalyst known in the prior art may be used which is capable of converting aliphatic unsaturatation to saturated product. Thus, the well known Raney nickel or nickel kieselguhr catalyst may be utilized. However, when using such catalysts, it is generally necessary to utilize a large amount of catalyst, a high reaction temperature (e.g. 150° to 200° C. or higher) and a high hydrogen pressure. Such high temperature hydrogenation condition can result in polymer degradation unless careful control of the hydrogenation process is exercised. Accordingly, it is desirable to employ a hydrogenation catalyst which permits the use of milder hydrogenation temperatures and pressures.

A preferred hydrogenation catalyst system for preparing the hydrogenated diblock copolymers of the compositions of the invention is disclosed in British Patent No. 1,184,120, the disclosure of which is incorporated herein by reference. As described in the aforementioned patent, suitable catalysts for that purpose are prepared by mixing an organic compound of a metal selected from the group consisting of nickel, cobalt and iron with an organometallic compound of a metal selected from Groups I, II and III of the Periodic Table of the Elements. Such catalysts have the advantage that they are soluble in the solution copolymer and permit selective hydrogenation of diene units in a viscous solution under relatively mild conditions such as for example near room temperature and under atmospheric pressure of hydrogen.

Among the organic compounds of nickel, cobalt or iron, one of the preferred compounds is a metal carboxylate. The metal carboxylates include nickel naphthenate, cobalt naphthenate, iron naphthenate, nickel octoate, and cobalt octoate. Another preferred compound is a metal chelate compound. As the chelating groups, beta-diketones, beta-hydroxycarbonyl compound, and 8-hydroxyquinoline may be used. The metal chelate compounds include bis (acetylacetone) nickel, tris(acetylacetone) cobalt, bis(ethyl acetoacetate) nickel, bis(salicylaldehyde) nickel, bis (8-hydroxyquinoline) nickel, tris (8-hydroxyquinoline)-cobalt, and bis(3,5-diisopropylsalicylic acid)-nickel. The preferred organic compounds are nickel compounds and of these nickel octoate is especially preferred.

Among the organometallic compounds of the metals of Group I,II or III, a metal hydrocarbyl compound of lithium, magnesium or aluminium is preferably used. Examples of such metal hydrocarbyl compounds include n-butyllithium, diethylmagnesium, triethylaluminium, triisobutylaluminium, triamylaluminium, and diethylisobutylaluminium. In addition to the organometallic compound, the metal hydrides such as lithium aluminium hydride and sodium borohydride may be used. The preferred organometallic compounds are organoaluminium compounds and of these triethylaluminium is especially preferred.

Further, besides the above mentioned two component catalysts, a three component soluble catalyst consisting of the above mentioned two catalytic components and an olefinically or acetylenically unsaturated hydrocarbon is also preferably used. The soluble catalyst consisting of the above mentioned two or three catalytic components is easily removed from the hydrogenated copolymer by adding polar solvent such as acetone and alcohol to the reaction mixture containing the hydrogenated copolymer and precipitating the polymer. To make the removal of the catalyst residue more effective, it is preferable to contact the reaction mixture with polar solvent or water containing a small amount of acid. The catalysts used for preparing the hydrogenated copolymer used in the present invention are not limited to the above mentioned soluble catalyst. Other catalysts which can effect the selective hydrogenation of diene units of high molecular weight copolymers without degradation or gelation may be used.

The amount of catalyst used in hydrogenating the diblock copolymers is dependent upon factors such as the particular type catalyst employed, the hydrogenation temperature and pressure and the like. When using the preferred nickel compounds, the quantity of catalyst may be varied within a range of from about 0.05 millimoles to 10 millimoles of nickel per 100 grams of polymer. In commercial applications, it is desirable to limit the residence time of hydrogenation and this may be achieved by using high catalyst to polymer ratios.

The diblock copolymers can be hydrogenated using the following ranges of reaction conditions. The concentration of copolymers to be hydrogenated may be from 0.5 to 50%, preferably from 2 to 35% by weight. Excellent hydrogenation efficiency is obtained by hydrogenation of a solution containing 10-20% of the block copolymers carried out at room temperature to 350° C., or even higher, preferably room temperature to 150° C., under hydrogen pressure from 1 atmosphere to 100 atmospheres, preferably 2-20 atmospheres. Reaction periods in the range of 0.5 to 24 hours, preferably 2 to 8 hours, can be employed.

In order to obtain polymers of the desired characteristics, the aliphatic unsaturation should be reduced to a value of approximately 0% to 20%, based upon the theoretical value of 100% for the unhydrogenated butadiene polymer. Preferably the residual aliphatic unsaturation in the products should be less than 10%.

The viscosities used to determine the molecular weight of the hydrogenated diblock copolymer are dilute solution viscosities (DSV). The dilute solution viscosity is defined as the inherent viscosity determined at 25° C. on a 0.4% solution of the polymer in toluene. The hydrogenated diblock copolymers employed in the compositions of the invention have DSV's ranging from 0.3 to 6.5, preferably 0.37 to 4.0, which corresponds to average molecular weights of from about 15,000 to 1,000,000, preferably from about 20,000 to about 500,000.

A more detailed description of processes for preparing the hydrogenated diblock copolymers used in the compositions of the invention may be found in U.S. Pat. No. 4,102,849, the disclosure of which has been incorporated herein by reference.

The compositions of the invention may contain from about 1 to about 35, preferably from 2 to 20, parts by weight of the thermoplastic elastomer based upon 100 parts total combined weight of thermoplastic elastomer and bitumen.

The bituminous material can be blended with the thermoplastic elastomer by any of the well known methods for blending asphalt materials with various rubbers. A preferred method of mixing the thermoplastic elastomer with bitumen is to stir the elastomer into preheated bitumen using high shear mixing equipment which will grind the elastomer into small particles as it is being dispersed into the hot bitumen.

The following examples are submitted for the purpose of further illustrating the nature of the present invention and are not to be considered as a limitation on the scope thereof. Parts and percentages shown in the examples are by weight unless otherwise indicated.

Examples 1-3

These examples illustrate bituminous compositions of the invention formed by blending various amounts of a thermoplastic elastomer comprising a hydrogenated diblock copolymer containing a hydrogenated block of polybutadiene and a hydrogenated block of a random butadiene/styrene copolymer (hereinafter designated H2Bd/S for convenience) with hot asphalt. For comparative purposes, a 100% asphalt composition was included to serve as a control (designated C, for convenience). The compositions were evaluated for viscosity at 180° C., cold bend failure temperature using the procedure set forth in DIN52123-12 (German Standard Specification) and flow temperature, DIN52123-13. Composition formulations, test conditions and test results are shown in Table I.

TABLE I

| Ex.# | Ingredients (wt. %) Asphalt[a] | Ingredients (wt. %) H2Bd-Bd/S[b] | Viscosity at 180° C. (poises) | Cold Bend Failure Temp. (°C.) DIN52123-12 | Flow Temp. (°C.) DIN52123-12 |
|---|---|---|---|---|---|
| 1 | 96 | 4 | 2 | −2.5 | 55 |
| 2 | 92 | 8 | 8 | −5.0 | 85 |
| 3 | 88 | 12 | 20 | −17.5 | 95 |
| C$_1$ | 100 | 0 | ND[c] | −2.5 | 45 |

[a]Petroleum asphalt AC-20 grade available from Trumbull, a division of Owens-Corning Fiberglas.
[b]A hydrogenated diblock copolymer containing 35% by weight of a hydrogenated block of polybutadiene having 1,2-microstructure content of 13% prior to hydrogenation and 65% by weight of a hydrogenated block of a random copolymer of butadiene/styrene containing 62.5% of butadiene and 37.5% of styrene with the butadiene portion of the random copolymer having a 1,2-microstructure content of 15% prior to hydrogenation The diblock copolymer has a molecular weight, $\bar{M}_n$, of 45,000, a residual aliphatic unsaturation content of 0.5% and a melt index (MI) of 108.
[c]N.D. = not determined.

Examples 4-6

In these examples, additional bituminous compositions of the invention were prepared by blending various amounts of H2Bd-Bd/S thermoplastic elastomer with hot asphalt. For comparative purposes, bituminous compositions were prepared by blending equivalent amounts of Kraton D1101, a styrene-butadiene-styrene (SBS) block copolymer with hot asphalt to serve as controls (designated C$_2$ for convenience). The compositions were tested for viscosity, cold bend failure temperature and flow temperature as in Examples 1-3. Composition formulations, test conditions and results are shown in Table II.

TABLE II

| Ex.# | Asphalt* (wt %) | Type Polymer | (wt %) | Viscosity at 180° C. (poises) | Cold Bend Failure Temp. (°C.) | Flow Temp. (°C.) |
| --- | --- | --- | --- | --- | --- | --- |
| 4 | 96 | H²Bd-Bd/S[a] | 4 | 4 | −5.0 | 50 |
| 5 | 92 | H²Bd-Bd/S[a] | 8 | 14 | −7.5 | 80 |
| 6 | 88 | H²Bd-Bd/S[a] | 12 | 40 | −20.0 | 90 |
| C₂ | 96 | Kraton D1101[b] | 4 | 3 | −2.5 | 55 |
| C₂ | 92 | Kraton D1101[b] | 8 | 11 | −5.0 | 85 |
| C₂ | 88 | Kraton D1101[b] | 12 | 35 | −10.0** | 90 |

*same as in Examples 1-3
**cracked at −10.0° C. but did not break - exhibited incompatability
[a] a hydrogenated diblock copolymer containing 35% by weight of a hydrogenated block of polybutadiene having a 1,2-microstructure content of 13% prior to hydrogenation and 65% by weight of a random copolymer of butadiene and styrene containing 70% butadiene and 30% styrene with the butadiene portion of the random copolymer having a 1,2-microstructure content of 15% prior to hydrogenation. The diblock copolymer has a molecular weight, $M_n$ of 61,000, a residual unsaturation content of 0.5% and a melt index (MI) of 28.
[b] a styrene-butadiene-styrene block copolymer having a styrene/butadiene ratio of 31/69 and a melt index (MI), condition G, grams p er 10 minutes, of <1 available from Shell Chemical Company.

Examples 7-9

In these examples, additional bituminous compositions of the invention were prepared by blending various amount of a H₂Bd-Bd/S thermoplastic elastomer with hot asphalt. For comparative purposes, bituminous compositions were prepared by blending equivalent amounts of Kraton G1650, a hydrogenated styrene-butadiene-styrene (H₂SBS) block copolymer with hot asphalt to serve as controls (designated C₃ for convenience). The compositions were tested for viscosity, cold bend failure temperature and flow temperature as in Examples 1-3. Composition formulations, test conditions and results are shown in Table III.

TABLE III

| | Ingredients | | | Viscosity at 180° C. | Cold Bend Failure | Flow Temp. |
| --- | --- | --- | --- | --- | --- | --- |
| Ex.# | Asphalt* (wt %) | Type Polymer | (Wt %) | (poises) | Temp. (°C.) | (°C.) |
| 7 | 96 | H²Bd-Bd/s[a] | 4 | 7 | −5.0 | 55 |
| 8 | 92 | H²Bd-Bd/s[a] | 8 | 25 | −17.5 | 95 |
| 9 | 88 | H²Bd-Bd/s[a] | 12 | 80 | −25.0 | 100 |
| C₃ | 96 | Kraton G1650[b] | 4 | 3 | 0 | 55 |
| C₃ | 92 | Kraton G1650[b] | 8 | 13 | −2.5 | 85 |
| C₃ | 88 | Kraton G1650[b] | 12 | 40 | −10.0** | 95 |

*same as in Examples 1-3
**cracked at −10.0° C. but did not break - exhibited incompatability.
[a] a hydrogenated diblock copolymer containing 35% by weight of a hydrogenated block of polybutadiene having a 1,2-microstructure content of 13% prior to hydrogenation and 65% by weight of a random copolymer of butadiene and styrene containing 70% butadiene and 30% styrene with the butadiene portion of the random copolymer having a 1,2-microstructure content of 15% prior to hydrogenation. The diblock copolymer has a molecular weight, $\overline{M}n$, of 61,000, a residual unsaturation content of 0.5% and a melt index (MI) of 28.
[b] a styrene-butadiene-styrene block copolymer having a styrene/butadiene ratio of 31/69 and a melt index (MI), condition G, grams per 10 minutes, of 1 available from Shell Chemical Company.

We claim:

1. A bituminous composition comprising a blend of:
   (a) from about 65% to about 99% by weight of bitumen; and
   (b) from about 1% to about 35% by weight of a thermoplastic elastomer containing two polymer blocks, wherein one of said polymer blocks is a crystalline polymer block of a hydrogenated polybutadiene having a Tm above 40° C. and one of said polymer blocks is an amorphous polymer block of a hydrogenated random copolymer of a vinyl arene and 1,3-butadiene having a Tg of 0° C. or lower and wherein the weight ratio of crystalline polymer block to amorphous polymer block is within the range of from 10:90 to 80:20.

2. The composition of claim 1 wherein said blend comprises from about 80% to about 98% by weight of said bitumen and from about 2% to about 20% by weight of said thermoplastic elastomer.

3. The composition of claim 1 wherein said bitumen is a petroluem based asphalt.

4. The composition of claim 1 wherein said bitumen is coal tar.

5. The composition of claim 1 wherein said thermoplastic elastomer is a hydrogenated diblock copolymer consisting essentially of from about 20% to about 70% by weight of a hydrogenated block of polybutadiene and from about 30% to about 80% by weight of a hydrogenated block of a random copolymer of a vinyl arene and 1,3-butadiene containing from about 5% to about 50% by weight of vinyl arene and from about 50% to about 95% by weight of butadiene, said hydrogenated diblock copolymer having a residual unsaturation content of less than 20% of the original unsaturation level prior to hydrogenation.

6. The composition of claim 5 wherein said vinyl arene is styrene.

7. The composition of claim 5 wherein said polybutadiene had a 1,2-microstructure content of less than 30% prior to hydrogenation.

8. A method of preparing a bituminous composition which comprises blending:
   (a) from about 65 to about 99% by weight of bitumen; and
   (b) from about 1 to about 35% by weight of a thermoplastic elastomer containing two polymer blocks, wherein one of said polymer blocks is a crystalline polymer block of a hydrogenated polybutadiene having a Tm above 40° C. and one of said polymer blocks is an amorphous polymer block of a hydrogenated random copolymer of a vinyl arene and 1,3-butadiene having a Tg of 0° C. or lower and wherein the weight ratio of crystalline polymer block to amorphous polymer block is within the range of from 10:90 to 80:20.

9. The method of claim 8 wherein said blend comprises from about 80 to about 98% by weight of said bitumen and from about 2% to about 20% by weight of said thermoplastic elastomer.

10. The method of claim 8 wherein said bitumen is a petroleum based asphalt.

11. The method of claim 8 wherein said bitumen is coal tar.

12. The method of claim 8 wherein said thermoplastic elastomer is a hydrogenated diblock copolymer consisting essentially of from about 20% to about 70% by weight of a hydrogenated block of polybutadiene and from about 30% to about 80% by weight of a hydrogenated block of a random copolymer of a vinyl arene and 1,3-butadiene containing from about 5% to about 50% by weight of vinyl arene and from about 50% to about 95% by weight of butadiene, said hydrogenated diblock copolymer having a residual unsaturation content of less than 20% of the original unsaturation level prior to hydrogenation.

13. The method of claim 8 wherein said vinyl arene is styrene.

14. The method of claim 8 wherein said polybutadiene had a 1,2-microstructure content of less than 30% prior to hydrogenation.

* * * * *

UNITED STATES PATENT AND TRADEMARK OFFICE
CERTIFICATE OF CORRECTION

PATENT NO. : 4,835,199

DATED : May 30, 1989

INVENTOR(S) : Shingo Futamura and Georg G. A. Bohm

It is certified that error appears in the above-identified patent and that said Letters Patent is hereby corrected as shown below:

Column 10, line 27, "$H_2Bd/S$" should read -- $H_2Bd-Bd/S$ --.

Signed and Sealed this

Sixth Day of February, 1990

*Attest:*

JEFFREY M. SAMUELS

*Attesting Officer*      *Acting Commissioner of Patents and Trademarks*